(12) United States Patent
Kumazaki et al.

(10) Patent No.: US 8,172,721 B2
(45) Date of Patent: May 8, 2012

(54) POWERTRAIN AND METHOD OF CONTROLLING THE SAME

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/929,505

(22) Filed: Jan. 28, 2011

(65) Prior Publication Data

US 2011/0130934 A1    Jun. 2, 2011

Related U.S. Application Data

(63) Continuation of application No. 12/010,271, filed on Jan. 23, 2008, now Pat. No. 7,963,881.

(30) Foreign Application Priority Data

Feb. 5, 2007    (JP) .................................. 2007-025658

(51) Int. Cl.
*B60W 10/02*    (2006.01)
(52) U.S. Cl. ........................................................... 477/5
(58) Field of Classification Search .................. None
See application file for complete search history.

(56) References Cited

U.S. PATENT DOCUMENTS

| 2002/0056332 A1 | 5/2002 | Suzuki |
| 2005/0272555 A1 | 12/2005 | Tabata et al. |

FOREIGN PATENT DOCUMENTS

| JP | A-2003-278912 | 10/2003 |
| JP | A-2005-206136 | 8/2005 |
| JP | A-2005-273900 | 10/2005 |
| JP | A-2006-17232 | 1/2006 |
| JP | A-2006-22844 | 1/2006 |
| JP | A-2006-46487 | 2/2006 |
| JP | A-2006-298067 | 11/2006 |

OTHER PUBLICATIONS

Nov. 27, 2009 Office Action issued for Japanese Application No. 2007-025658.
Mar. 2, 2010 Office Action issued in Japanese Patent Application No. 2007-025658.
Jul. 13, 2010 Office Action issued in JP Application No. 200810005604X.

*Primary Examiner* — David D Le
*Assistant Examiner* — Erin D Bishop
(74) *Attorney, Agent, or Firm* — Oliff & Berridge, PLC

(57) ABSTRACT

When a reduction in a supply hydraulic pressure to a second shift portion is sensed, an engagement command of C0 clutch is generated so that a power split device (electrical differential portion) is brought into a locked state. In the locked state, a sun gear, a carrier rotated by an engine and a ring gear rotated by a second MG integrally rotate, whereby inertia is increased. Thus, high-speed rotation of a transmission member corresponding to an input shaft of the second shift portion can be prevented.

10 Claims, 12 Drawing Sheets

FIG. 3

| | C0 | C1 | C2 | B0 | B1 | B2 | B3 | GEAR RATIO | STEP |
|---|---|---|---|---|---|---|---|---|---|
| 1ST | ◎ | ○ | × | × | × | × | ○ | 3.357 | |
| 2ND | ◎ | ○ | × | × | × | ○ | × | 2.180 | 1.54 |
| 3RD | ◎ | ○ | × | × | ○ | × | × | 1.424 | 1.53 |
| 4TH | ◎ | ○ | ○ | × | × | × | × | 1.000 | 1.42 |
| 5TH | × | ○ | ○ | ◎ | × | × | × | 0.705 | 1.42 |
| R | × | × | ○ | × | × | × | ○ | 3.209 | |
| N | × | × | × | × | × | × | × | | TOTAL 4.76 |
| P | × | × | × | × | × | × | × | | |

○ ENGAGED
× DISENGAGED
◎ ENGAGED IN STEPWISE SHIFT STATE, DISENGAGED IN CONTINUOUS SHIFT STATE

| | C0 | C1 | C2 | B0 | B2 | B3 | GEAR RATIO | STEP |
|---|---|---|---|---|---|---|---|---|
| 1ST | ◎ | ○ | × | × | × | ○ | 2.804 | |
| | | | | | | | | 1.54 |
| 2ND | ◎ | ○ | × | × | ○ | × | 1.531 | |
| | | | | | | | | 1.53 |
| 3RD | ◎ | ○ | ○ | × | × | × | 1.000 | |
| | | | | | | | | 1.42 |
| 4TH | × | ○ | ○ | ◎ | × | × | 0.705 | |
| R | × | × | ○ | × | × | ○ | 2.393 | |
| | | | | | | | | TOTAL 3.977 |
| N | × | × | × | × | × | × | | |
| P | × | × | × | × | × | × | | |

○ ENGAGED
× DISENGAGED
◎ ENGAGED IN STEPWISE SHIFT STATE, DISENGAGED IN CONTINUOUS SHIFT STATE

POWERTRAIN AND METHOD OF CONTROLLING THE SAME

This is a Continuation of U.S. patent application Ser. No. 12/010,271 filed Jan. 23, 2008. The disclosure of the prior application is incorporated herein by reference in its entirety.

This nonprovisional application is based on Japanese Patent Application No. 2007-025658 filed with the Japan Patent Office on Feb. 5, 2007, the entire contents of which are hereby incorporated by reference.

BACKGROUND OF THE INVENTION

1. Field of the Invention

The present invention relates to a powertrain and a method of controlling the same, and in particular, to a technique of controlling a powertrain for a vehicle having an engine and a rotating electric machine as motive power sources.

2. Description of the Background Art

Conventionally, a hybrid vehicle having an internal combustion engine and a rotating electric machine as motive power sources is known. In such a hybrid vehicle, at least one of the internal combustion engine and the rotating electric machine is used in accordance with a traveling state of the vehicle. For example, the internal combustion engine is mainly used for traveling at a high speed, and the rotating electric machine is mainly used for traveling at an intermediate or low speed. One such hybrid vehicle is configured to allow a differential mechanism having an engine and an electric rotating machine coupled thereto to function as a continuously variable transmission.

For example, Japanese Patent Laying-Open Nos. 2006-046487 and 2006-017232 disclose a vehicular drive apparatus transmitting an output of a drive force source to driving wheels via two shift mechanisms, which are: a continuous shift portion constituted of the aforementioned differential mechanism; and a stepwise shift portion provided in a stage behind the continuous shift portion.

In particular, Japanese Patent Laying-Open No. 2006-046487 provides a control apparatus that changes, when one of the two shift mechanisms has entered a failure state where a normal operation is not possible, a gear ratio of the other shift mechanism so that a total gear ratio, which is implemented based on a gear ratio of the continuous shift portion and a gear ratio of the stepwise shift portion, is attained in the value immediately before the failure of the one shift mechanism. With the control apparatus, the traveling performance of the vehicle can be ensured even if one of the two shift mechanisms has failed.

Japanese Patent Laying-Open No. 2006-017232 discloses switching an operation of the continuous shift portion to a stepwise shift state when an electric motor for allowing the differential mechanism to function as a shift mechanism has entered a state where a normal operation is not possible, thereby ensuring appropriate traveling performance of the vehicle.

According to the powertrain disclosed in Japanese Patent Laying-Open Nos. 2006-046487 and 2006-017232, the shift mechanism is configured to include a plurality of engagement elements (clutches and brakes) that are engaged or disengaged by a hydraulic actuator. Accordingly, in a high-load traveling of the vehicle, that is, when the engine or the rotating electric machine as a drive force source is outputting torque, if a situation where a supply hydraulic pressure to a stepwise shift portion is reduced occurs, each engagement element is disengaged, whereby each rotary element rotates at a high speed. Thus, durability of the electric motor or constituent components of the shift mechanism may possibly be deteriorated. When the shift mechanism is formed with a CVT (continuously variable transmission) also, the problem of high-speed rotation of the rotary elements associated with a reduction in the supply hydraulic pressure similarly occurs.

SUMMARY OF THE INVENTION

An object of the present invention is to prevent high-speed rotation of each rotary element when there is a reduction in a supply hydraulic pressure to a shift mechanism, thereby preventing deterioration of the durability.

The present invention is directed to a powertrain including: an electrical differential portion being configured such that a differential operation of an input rotation speed and an output rotation speed is controlled by an first electric motor having its operation state controlled, the electric motor being coupled to a rotary element of the electrical differential portion so as to be capable of transmitting motive power; an engagement element allowing the motive power to be transmitted from the electrical differential portion to a driving wheel by receiving a supply hydraulic pressure; a differential state switching mechanism configured to switch the electrical differential portion between a differential state where differential is performed and a locked state where the differential is not performed; and a control apparatus configured to bring the electrical differential portion into the locked state by the differential state switching mechanism when there is a reduction in the supply hydraulic pressure to the engagement element.

The present invention is directed to a method of controlling a powertrain including: an electrical differential portion being configured such that a differential state of an input rotation speed and an output rotation speed is controlled by an electric motor having its operation state controlled, the electric motor being coupled to a rotary element of the electrical differential portion so as to be capable of transmitting motive power; an engagement element allowing the motive power to be transmitted from the electrical differential portion to a driving wheel by receiving a supply hydraulic pressure; and a differential state switching mechanism configured to switch the electrical differential portion between a differential state where differential is performed and a locked state where the differential is not performed. The method includes: a step of sensing a reduction in the supply hydraulic pressure to the engagement element; and a step of bringing the electrical differential portion into the locked state by the differential state switching mechanism, when the reduction in the supply hydraulic pressure is sensed.

Preferably, the electrical differential portion is configured to operate as a continuous shift mechanism by the electric motor (first electric motor) having its operation state controlled. Alternatively, the shift portion configured to function as a stepwise automatic shift portion by combinations of engagement and disengagement of the engagement elements is further provided. Further preferably, the electrical differential portion includes a planetary gear.

According to the powertrain and the method of controlling the same, by bringing the electrical differential portion into the locked state when a reduction in the supply hydraulic pressure to the engagement element is sensed, the inertia of the rotary element can be increased, whereby an increase in the rotation speed is suppressed. As a result, even when the engagement element constituting part of the power transmission route is disengaged, the rotary element constituting the shift mechanism is prevented from rotating at an excessively high speed, and thus deterioration in its durability can be prevented.

Preferably, one of a plurality of the rotary elements included in the electrical differential portion is coupled to an engine. The control apparatus is configured to additionally perform reduction in output torque of the engine, when there is a reduction in the supply hydraulic pressure to the engagement element. Alternatively, in the method of controlling the powertrain, in the step of bringing into the locked state, reduction in output torque of the engine is additionally performed. Specifically, the control apparatus performs reduction in output torque of the engine by one of fuel cut, retarding angle of ignition timing and stopping combustion in a part of cylinders.

With such a configuration, reduction in the output torque of the engine can further surely prevent the output shaft of the electrical differential portion from rotating at a high speed. As a result, deterioration in durability of the constituent components of a shift mechanism when there is a reduction in the supply hydraulic pressure to the engagement element can further surely be prevented.

Further preferably, the control apparatus includes a determine portion. The determine portion, by determination based on a state of a vehicle incorporating the powertrain, forcibly renders lock control nonexecutable even when there is a reduction in the supply hydraulic pressure to the engagement element, if it is not a vehicular situation where a rotary element included in at least one of the electrical differential portion and a shift portion being configured to include the engagement element may rotate at a high rotation speed if there is a reduction in the supply hydraulic pressure, the lock control being for bringing the electrical differential portion into the locked state by the differential state switching mechanism. Specifically, the determine portion forcibly renders the lock control nonexecutable when an accelerator pedal position of the vehicle is lower than prescribed degree, or when a wheel speed of the vehicle is not greater than a prescribed value. Alternatively, the determine portion forcibly renders the lock control nonexecutable in accordance with a currently selected shift position or range.

With such a configuration, only in a vehicular situation where each rotary element may rotate at a high speed if there is a reduction in the supply hydraulic pressure to the engagement element, the lock control for forcibly bring the electrical differential portion into the locked state can be executed (alone, or, a reduction in the engine torque output performed in addition thereto).

Alternatively, preferably, the control apparatus is configured to prohibit or limit switching of the gear ratio in a shift portion being configured to include the engagement element, when the control apparatus has brought the electrical differential portion into the locked state in accordance with the reduction in the supply hydraulic pressure to the engagement element.

With such a configuration, the disengagement/engagement state of each engagement element in the shift portion is not largely changed in a state where the supply hydraulic pressure is reduced, and therefore additional unintended fluctuation in the rotation speed can be prevented.

Preferably, electric power is allowed to be transmitted and received between the first electric motor and a second electric motor being coupled to an output shaft of the electrical differential portion in the differential state of the electrical differential portion, while electric power is not transmitted and received between the first electric motor and the second electric motor in the locked state of the electrical differential portion.

Alternatively, preferably, the powertrain further includes a switching mechanism provided separately from the differential state switching mechanism, for switching the electrical differential portion to the locked state, and a gear ratio of the electrical differential portion in the locked state by the differential state switching mechanism is higher than the gear ratio in the locked state by the switching mechanism.

Preferably, the electrical differential portion is switched to the locked state by the differential state switching mechanism in a high-vehicle speed region. Alternatively, the electrical differential portion is switched to the locked state by the differential state switching mechanism in a high-load region.

Accordingly, the primary advantage of the present invention is in that deterioration in durability is prevented by preventing each rotary element from rotating at a high speed when the supply hydraulic pressure to the engagement element is reduced in the powertrain.

The foregoing and other objects, features,aspects and advantages of the present invention will become more apparent from the following detailed description of the present invention when taken in conjunction with the accompanying drawings.

BRIEF DESCRIPTION OF THE DRAWINGS

FIG. 3 is an operation table of the transmission shown in FIG. 2.

DESCRIPTION OF THE PREFERRED EMBODIMENTS

Figure 1:
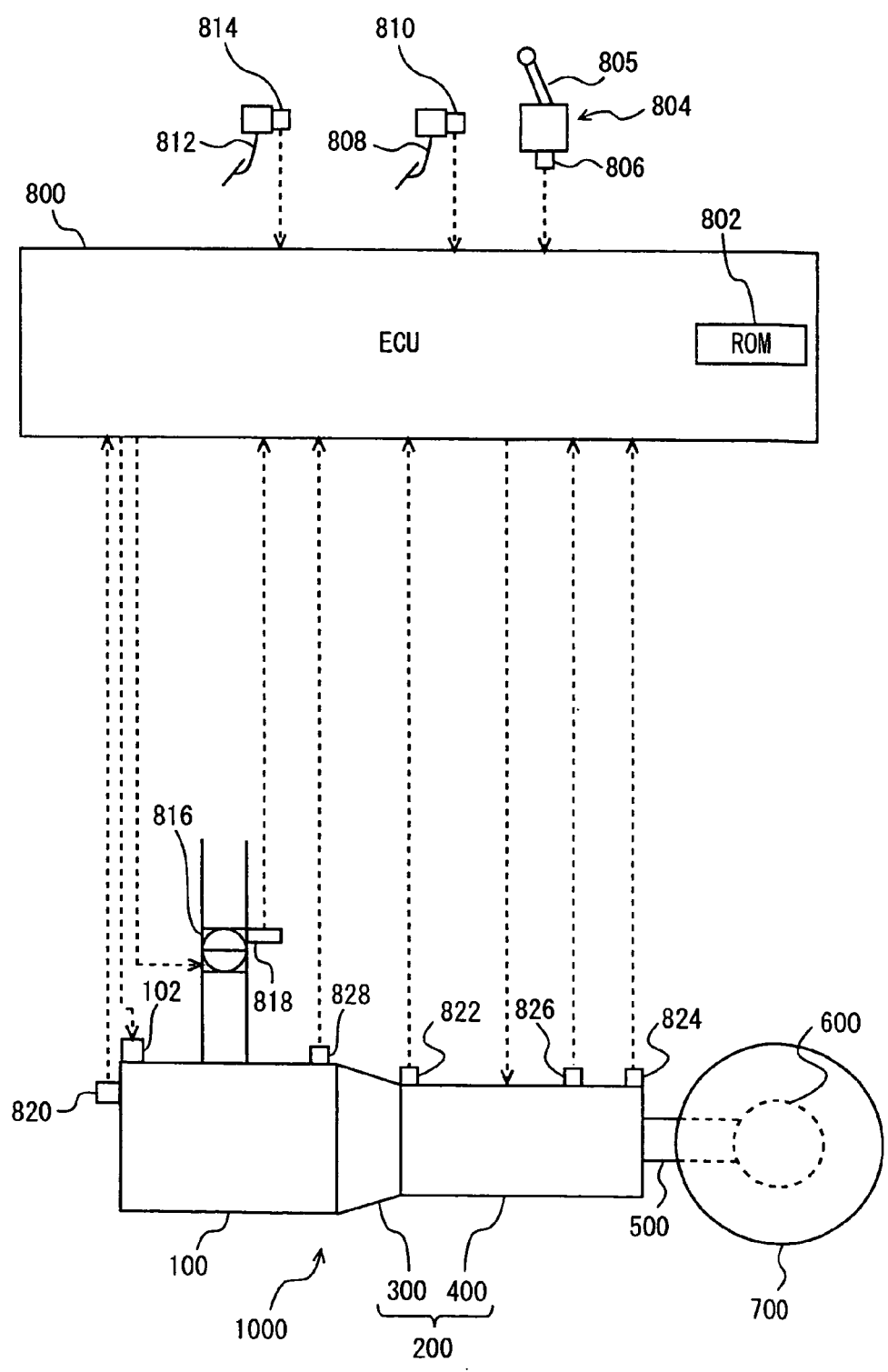
FIG. 1 is a block diagram showing a schematic configuration of a hybrid vehicle incorporating a powertrain according to an embodiment of the present invention.

In the following, referring to the drawings, an embodiment of the present invention will be described in detail. In the following description, identical or corresponding parts are denoted by identical reference characters and description thereof will not basically be repeated.

Referring to FIG. 1, a hybrid vehicle incorporating a powertrain according to the embodiment of the present invention will be described. While the hybrid vehicle is illustrated as an FR (Front engine Rear drive) vehicle in FIG. 1, the present invention is applicable to any hybrid vehicle other than an FR vehicle.

The hybrid vehicle includes an engine 100, a transmission 200, a propeller shaft 500, a differential gear 600, rear wheels 700 that are driving wheels, and an ECU (Electronic Control Unit) 800. The method of controlling a powertrain according to the present embodiment is implemented by, for example, the execution of a program recorded in ROM (Read Only Memory) 802 of ECU 800. A powertrain 1000 includes engine 100 and transmission 200.

Engine 100 is an internal combustion engine that burns an air-fuel mixture of fuel injected from an injector 102 and air, inside a combustion chamber of a cylinder. A piston in the cylinder is pushed down by the combustion, and a crankshaft is rotated.

Transmission 200 is coupled to engine 100. As described later, transmission 200 includes a first shift portion 300 and a second shift portion 400. Torque output from transmission 200 is transmitted to right and left rear wheels 700 via propeller shaft 500 and differential gear 600.

Connected to ECU 800 via a harness or the like are a position switch 806 of a shift lever 805 provided to a shift operation portion 804, an accelerator pedal position sensor 810 of an accelerator pedal 808, a brake switch 814 of a brake pedal 812, a throttle position sensor 818 of an electronic throttle valve 816, an engine speed sensor 820, an input shaft rotation speed sensor 822, an output shaft rotation speed sensor 824, an oil temperature sensor 826, and a water temperature sensor 828. It is to be noted that, in the present embodiment, the term "rotation speed" means the number of rotation per unit time (representatively [rpm]).

The position of shift lever 805 is detected by position switch 806, and a signal representing the detection result is transmitted to ECU 800. Corresponding to the position of shift lever 805, a range is selected, and shift in transmission 200 is achieved automatically according to the range.

Accelerator pedal position sensor 810 detects the position of accelerator pedal 808, and transmits a signal representing the detection result to ECU 800. Brake switch 814 detects a brake operation (an operation of brake pedal 812 by the driver), and transmits a signal representing the detection result to ECU 800.

Throttle position sensor 818 detects the position of electronic throttle valve 816 having its position adjusted by an actuator, and transmits a signal representing the detection result to ECU 800. The amount of air taken into engine 100 (an output of engine 100) is adjusted by electronic throttle valve 816.

It is to be noted that, instead of or in addition to electronic throttle valve 816, an intake valve (not shown) or an exhaust valve (not shown) may have its lift amount or opening/closing phase changed so that the amount of air taken into engine 100 is adjusted.

Engine speed sensor 820 detects the rotation speed of an output shaft (crankshaft) of engine 100, and transmits a signal representing the detection result to ECU 800. Input shaft rotation speed sensor 822 detects an input shaft rotation speed NI of second shift portion 400, and transmits a signal representing the detection result to ECU 800. Output shaft rotation speed sensor 824 detects an output shaft rotation speed NO of transmission 200 (second shift portion 400), and transmits a signal representing the detection result to ECU 800.

Oil temperature sensor 826 detects the temperature (oil temperature) of oil (Automatic Transmission Fluid, ATF) used for actuation or lubrication of transmission 200, and transmits a signal representing the detection result to ECU 800.

Water temperature sensor 828 detects the temperature (water temperature) of coolant of engine 100, and transmits a signal representing the detection result to ECU 800.

ECU 800 provides control over various devices such that the vehicle attains a desired traveling state based on signals transmitted from position switch 806, accelerator pedal position sensor 810, brake switch 814, throttle position sensor 818, engine speed sensor 820, input shaft rotation speed sensor 822, output shaft rotation speed sensor 824, oil temperature sensor 826, water temperature sensor 828 and the like, as well as map and program stored in ROM 802.

Figure 2:
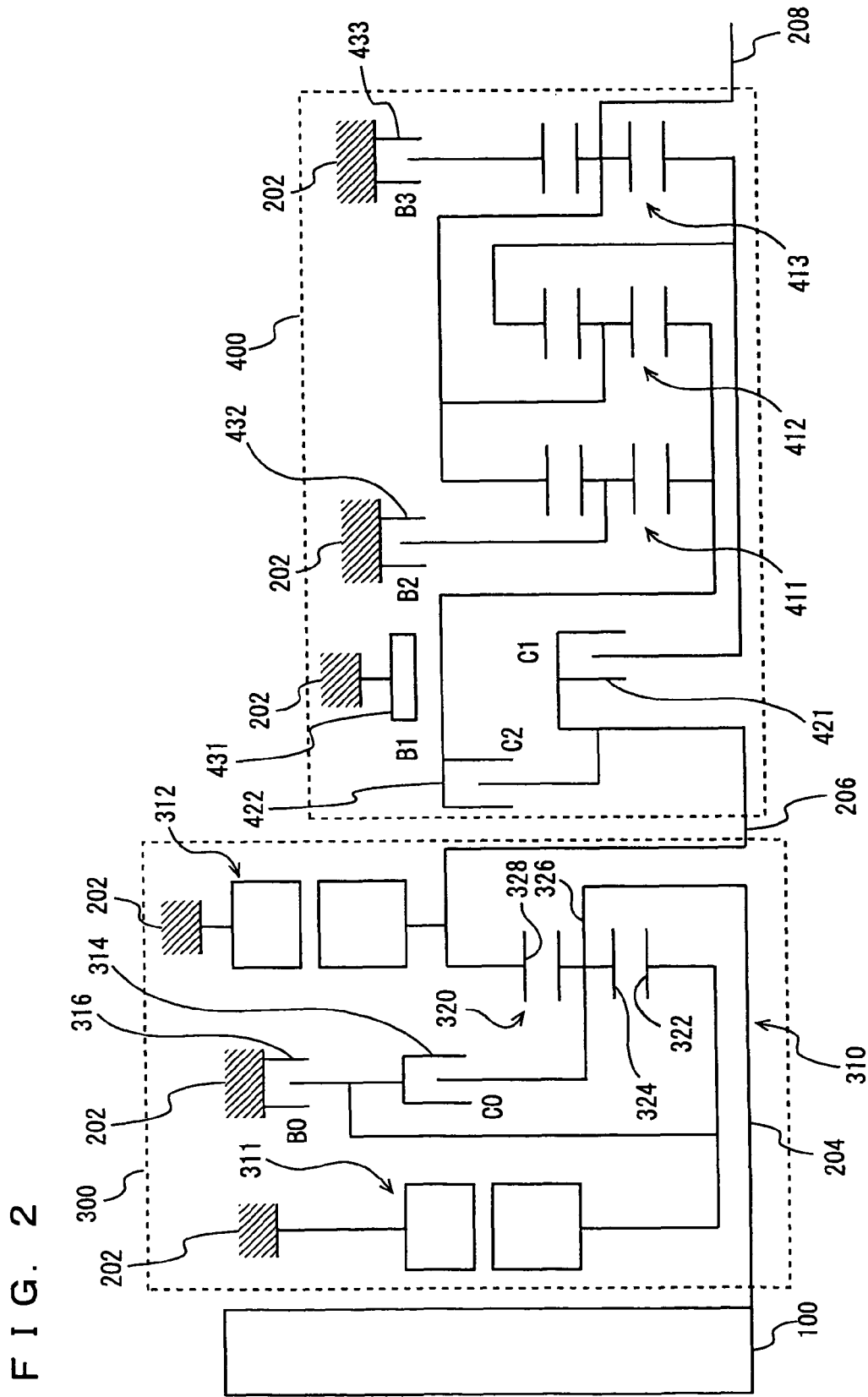
FIG. 2 is a skeleton diagram showing an exemplary configuration of the transmission shown in FIG. 1.

Next, using FIG. 2, a detailed configuration of transmission 200 shown in FIG. 1 is described.

Referring to FIG. 2, included in transmission 200 as coaxially arranged in a case 202 that is a non-rotary member mounted on the vehicle body are: an input shaft 204 being an input rotary member; a first shift portion 300 coupled directly or via a damper (not shown) to input shaft 204; a second shift portion 400 serially coupled in a power transmitting route between first shift portion 300 and rear wheels 700 via a transmission member (transmission shaft) 206; and an output shaft 208 being an output rotary member coupled to second shift portion 400.

Transmission 200 is configured symmetrically relative to its axis. Accordingly, the lower part of transmission 200 is omitted in FIG. 2 in the portion where transmission 200 is shown.

First shift portion 300 includes a power split device 310, a first MG (Motor Generator) 311, and a second MG 312. First shift portion 300 further includes two engagement elements of a C0 clutch 314 and a B0 brake 316.

Power split device 310 splits the output of engine 100 being input to input shaft 204 for first MG 311 and transmission member 206. Power split device 310 is constituted of a planetary gear 320.

Planetary gear 320 includes a sun gear 322, a pinion gear 324, a carrier 326 supporting pinion gear 324 so that it can rotate on its own axis and revolve around sun gear 322, and a ring gear 328 meshing with sun gear 322 via pinion gear 324.

In power split device 310, carrier 326 is coupled to input shaft 204, i.e., to engine 100. Sun gear 322 is coupled to first MG 311. Ring gear 328 is coupled to second MG 312 via transmission member 206.

Power split device 310 functions as a differential apparatus, by the relative rotation of sun gear 322, carrier 326, and ring gear 328. By the differential function of power split device 310, the output of engine 100 is divided for first MG 311 and for transmission member 206.

First MG 311 generates power using part of the divided output of engine 100, and/or second MG 312 rotates using the power generated by first MG 311, whereby power split device 310 functions as a continuously variable transmission.

First MG 311 and second MG 312 are three-phase alternating current rotating electric machines (electric motors). First MG 311 is coupled to sun gear 322 of power split device 310. Second MG 312 is provided such that rotors integrally rotate with transmission member 206.

First MG 311 and second MG 312 are controlled so as to satisfy target output torque of transmission 200 that is calculated from, for example, the accelerator pedal position and the vehicle speed, and to realize the optimum fuel efficiency in engine 100.

C0 clutch 314 is provided so as to couple sun gear 322 and carrier 326. B0 brake 316 is provided so as to couple sun gear 322 to case 202.

Second shift portion 400 includes three single pinion type planetary gears 411-413 and five engagement elements of a C1 clutch 421, a C2 clutch 422, a B1 brake 431, a B2 brake 432, and a B3 brake 433. As will be described in detail below, second shift portion 400 functions as a stepwise automatic shift transmission (a stepwise automatic shift portion) by combinations of engagement and disengagement of the engagement elements. Second shift portion 400 corresponds to "a shift portion" in the present invention.

As C0 clutch 314, C1 clutch 421, C2 clutch 422, B0 brake 316, B1 brake 431, B2 brake 432, and B3 brake 433, hydraulic frictional engagement apparatuses (wet multi-plate type, band brake type or the like) commonly used in a conventional automatic transmission for a vehicle are representatively employed. It is to be noted that any engagement apparatuses other than the frictional engagement apparatuses can be used as such engagement elements (the clutches and brakes).

By the engagement of the engagement elements of first shift portion 300 and second shift portion 400 in the combinations shown in the operation table of FIG. 3, switching between a continuous shift state and a stepwise shift state, and selection of five forward gears of first to fifth gears are performed in transmission 200.

When C0 clutch 314 and B0 brake 316 are in a disengaged state, the relative rotation of sun gear 322, carrier 326 and ring gear 328 is permitted. In this state, power split device 310 functions as a continuously variable mechanism. That is, transmission 200 enters a continuous shift state. In this state, by controlling the operation state (for example, rotation speed or torque) of first MG 311, the differential operation of input shaft 204 and transmission member 206 (corresponding to the output shaft of first shift portion 300) is electrically controlled.

On the other hand, when C0 clutch 314 is in an engaged state, sun gear 322, carrier 326 and ring gear 328 are integrally engaged and the relative rotation of the gears is prohibited. In this state, power split device 310 is in a "locked state" where the three gears integrally rotate and the differential action is disabled. Thus, power split device 310 does not function as a continuously variable mechanism. That is, a stepwise shift state in which gear ratio changes stepwise in transmission 200 is established. C0 clutch 314, which is capable of controlling, by its disengagement/engagement, whether power split device 310 being "an electrical differential portion" should be in a continuous shift state (differential state) where electrical differential is performed or in a locked state where the differential state is locked as described above, corresponds to "a differential state switching mechanism" in the present invention. In the locked state, the transmission and reception of electric power between first MG 311 and second MG 312 as described above is not performed, different than in the differential state.

When B0 brake 316 is in an engaged state, sun gear 322 is fixed to case 202. In this state also, power split device 310 does not function as a continuously variable transmission. That is, transmission 200 enters a stepwise shift state.

Thus, B0 brake 316 provided separately from C0 clutch 314 also can switch power split device 310 to the locked state. It is understood from FIG. 3 that a gear ratio in the locked state by C0 clutch 314 is higher than a gear ratio in the locked state by B0 brake 316.

It is to be noted that, even when C0 clutch 314 and B0 brake 316 are in a disengaged state, it is possible to allow power sprit device 310 to function as a stepwise shift mechanism, by controlling the rotation speed ratio between input shaft 204 and transmission member 206 to be a prescribed value, by controlling the operation state (for example, rotation speed or torque) of first MG 311.

As shown in FIG. 3, in transmission 200 in the stepwise shift state where C0 clutch 314 or B0 brake 316 are engaged, in first gear (1ST), by the engagement of C0 clutch 314, C1 clutch 421 and B3 brake 433, the maximum gear ratio of, for example, about "3.357" is attained. By the engagement of C0 clutch 314, C1 clutch 421 and B2 brake 432, second gear (2ND) where the gear ratio is smaller than in first gear (1ST), e.g., about "2.180", is established.

Similarly, in transmission 200 in a stepwise shift state, by the engagement of C0 clutch 314, C1 clutch 421 and B1 brake 431, third gear (3RD) where the gear ratio is smaller than in second gear (2ND), e.g., about "1.424", is established. By the engagement of C0 clutch 314, C1 clutch 421 and C2 clutch 422, fourth gear (4TH) where the gear ratio is smaller than in third gear (3RD), e.g., about "1.000", is established. By the engagement of C1 clutch 421, C2 clutch 422, and B0 brake 316, fifth gear (5TH) where the gear ratio is smaller than in fourth gear (4TH), e.g., about "0.705", is established.

By the engagement of C2 clutch 422 and B3 brake 433, reverse gear (R) where the gear ratio is an intermediate value between first gear (1ST) and second gear (2ND), e.g., about "3.209", is established.

On the other hand, in transmission 200 in a continuous shift state where C0 clutch 314 and B0 brake 316 are disengaged, first shift portion 300 functions as a continuous shift mechanism, and second shift portion 400 serially connected to first shift portion 300 functions as a stepwise transmission in which one of first to fifth gears is selected in accordance with the operation table of FIG. 3. That is, for the gear (one of first to fifth gears) of second shift portion 400, an input shaft rotation speed NI of second shift portion 400, that is, the rotation speed of transmission member 206, is continuously varied, whereby a gear ratio width can be obtained for each of the gears continuously. Thus, the gear ratio that is continuously variable without steps between each of the gears is obtained, whereby the total gear ratio for the whole transmission 200 can be obtained in a continuous manner.

When P (Parking) position or N (Neutral) position is selected by shift operation portion 804, all the engagement elements are brought into a disengaged state. Accordingly, transmission 200 enters a state where it cannot transmit torque to wheels. In this state, ring gear 328 cannot receive the reaction force of the driving force being output from engine 100.

Figure 4:
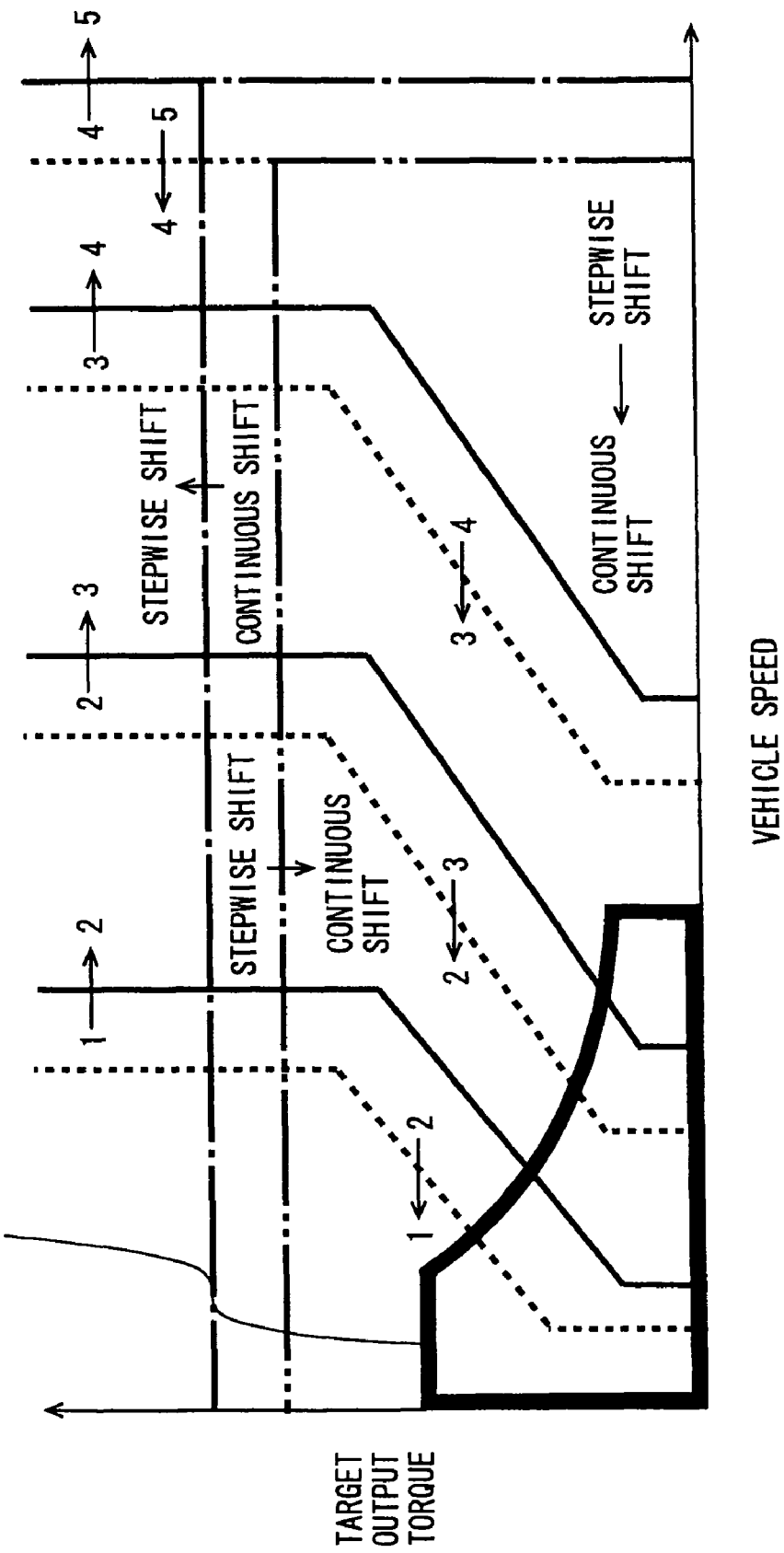
FIG. 4 is a shift map.

Shift (including switching between a continuous shift state and a stepwise shift state) in transmission 200 is automatically controlled based on the shift map shown in FIG. 4, for example. The shift map in the present embodiment is determined with the parameters of target output torque calculated from accelerator pedal position and/or vehicle speed, and the vehicle speed. It is to be noted that parameters of a shift map are not limited thereto.

In FIG. 4, the solid line represents the up-shift line, and the dashed line represents the down-shift line. The range enclosed by the bold solid line in FIG. 4 represents a range where the vehicle travels using only the driving force of second MG 312 and without using the driving force of engine 100. The alternate long and short dash line in FIG. 4 is a switch line for switching from the continuous shift state to the stepwise shift state. The alternate long and two short dashes line in FIG. 4 is a switch line for switching from the stepwise shift state to the continuous shift state. As understood from FIG. 4, transmission 200 is switched to the stepwise shift state in a relatively high-load region and/or a relatively high-vehicle speed region.

Figure 5:
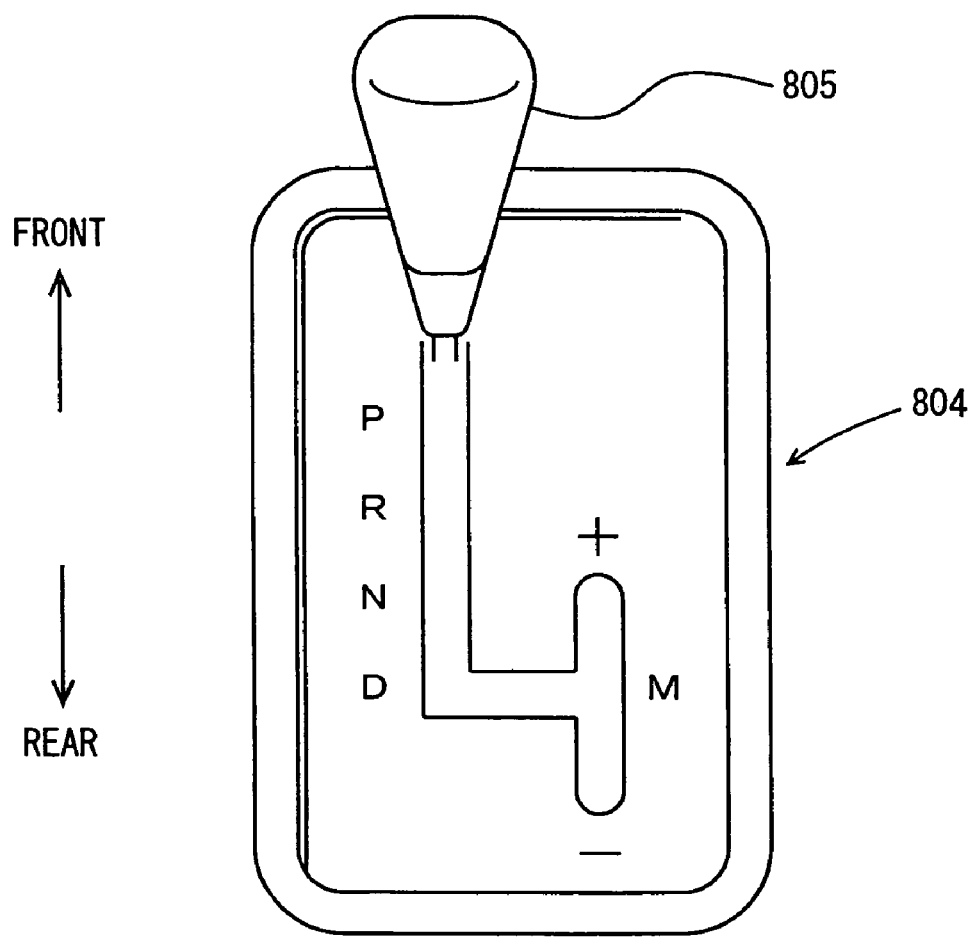
FIG. 5 is an exterior view illustrating an exemplary configuration of the shift operation portion shown in FIG. 1.

Alternatively, shift operation portion 804 shown in FIG. 1 may be configured as shown in FIG. 5, so that shifting in transmission 200 can be performed by manual operation of the driver.

Referring to FIG. 5, shift operation portion 804 is arranged, for example, on the floor beside the driver's seat in the vehicle, along the front-rear direction of the vehicle. To shift operation portion 804, shift lever 805 operated by the driver is provided.

The driver can select various shift positions (ranges) by sliding shift lever 805 forward and backward. The shift positions are arranged, from the front side, in the order of parking (P), reverse (N), neutral (N), and drive (D). Engagement/disengagement of each engagement element when parking (P), reverse (R), and neutral (N) are selected is as shown in FIG. 3.

When drive (D) is selected, in accordance with the shift map of FIG. 4, switching of continuous shift state/stepwise shift state and selection of first to fifth gears are automatically controlled.

As shown in FIG. 5, the driver can select manual (M) as the shift position (range), by sliding shift lever 805 from drive (D) position sideways. When manual (M) is selected, transmission 200 is set to be in the stepwise shift state, and one of first to fifth gears is selected in accordance with the operation of shift lever 805 by the driver.

When shift lever 805 is in manual (M) position, in a state where the driver takes his hand off shift lever 805, shift lever 805 is in a center position in M position and the current forward gear is maintained. On the other hand, when the driver operates shift lever 805 to be tilted toward rear side (−side) from the center position, the forward gear is downshifted from the current gear. When the driver operates shift lever 805 to be tilted toward front side (+side) from the center position, the forward gear is upshifted from the current gear. Here, shift lever 805 does not continuously slide along the front-rear direction, but rather shifts sectionally. That is, shift lever 805 will be in one of the three states of the center position state, the frontward-tilted state, and the rearward-tilted state. When the driver reduces the force on shift lever 805, shift lever 805 immediately returns to the center position. That is, the forward gear when manual (M) is selected varies stepwise in accordance with the number of operations of shift lever 805 in the front-rear direction.

When shifting is performed in the transmission 200 as described above, C0 clutch 314, B0 brake 316, C1 clutch 421, C2 clutch 422, B1 brake 431, B2 brake 432 and B3 brake 433 actuate by hydraulic pressure.

Figure 6:
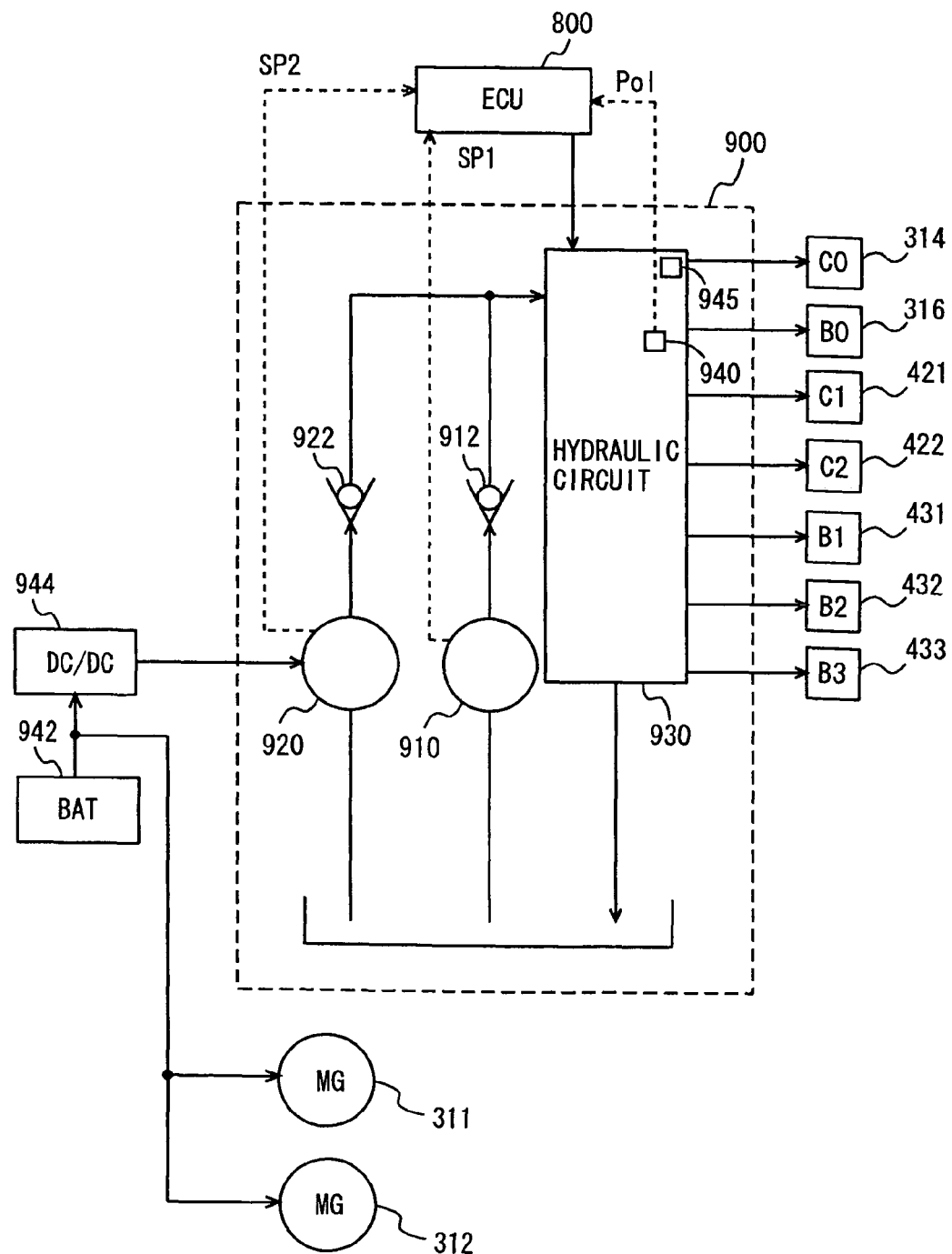
FIG. 6 shows a configuration of a hydraulic pressure control apparatus supplying and evacuating hydraulic pressure to each engagement element.

As shown in FIG. 6, in the present embodiment, a hydraulic control apparatus 900 feeding and exhausting hydraulic pressure to and from each engagement element to control each engagement element to engage and disengage is provided. Hydraulic control apparatus 900 includes a mechanical oil pump 910 and an electric motor driven oil pump 920, and a hydraulic circuit 930 that adjusts hydraulic pressure generated at oil pumps 910 and 920 to be a line pressure and also uses the line pressure as an initial pressure to provide an adjusted hydraulic pressure and feed and exhaust the adjusted hydraulic pressure to and from each engagement element, and also supplies an appropriate portion with oil for lubrication.

Mechanical oil pump 910 is a pump driven by engine 100 to generate hydraulic pressure. Mechanical oil pump 910 is arranged coaxially with carrier 326, and receives torque from engine 100 to operate. That is, rotation of carrier 326 drives mechanical oil pump 910 and hydraulic pressure is generated.

In contrast, electric motor driven oil pump 920 is a pump driven by a motor (not shown). Electric motor driven oil pump 920 is attached at an appropriate location such as an exterior of a case 202. Electric motor driven oil pump 920 is controlled by ECU 800 to generate hydraulic pressure as desired. For example, the rotation speed or the like of electric motor driven oil pump 920 is feedback-controlled.

Electric motor driven oil pump 920 is actuated by electric power supplied from a battery 942 via a DC/DC converter 944. The electric power of battery 942 is supplied to first MG 311 and second MG 312 besides electric motor driven oil pump 920.

Hydraulic circuit 930 includes a plurality of solenoid valves, switching valves or pressure adjustment valves (all not shown) and is configured to be capable of electrically controlling pressure adjustment, and hydraulic pressure to be fed and exhausted. It is controlled by ECU 800.

Note that oil pumps 910 and 920 are provided at their respective discharging sides with check valves 912 and 922, which are opened by pressures respectively caused as oil pumps 910 and 920 discharge, and are closed for a direction opposite to that of the pressures. Oil pumps 910 and 920 are connected parallel to each other relative to hydraulic circuit 930. Furthermore, a valve (not shown) that adjusts line pressure is configured to control the line pressure to have two states. More specifically, it increases an amount discharged and thus provides increased line pressure and, in contrast, decreases an amount discharged and thus provides decreased line pressure.

Hydraulic circuit 930 is provided with a hydraulic pressure sensor 940 arranged to be capable of sensing at least the supply hydraulic pressure to C1 clutch 421, C2 clutch 422, B1 brake 431, B2 brake 432 and B3 brake 433 being engagement elements in second shift portion 400. Hydraulic pressure Po1 sensed by hydraulic pressure sensor 940 is transmitted to ECU 800. It is configured such that, when a failure occurs in oil pumps 910, 920, respective failure sensing signals SP1, SP2 are transmitted to ECU 800.

In transmission 200, if the hydraulic pressure that can be supplied (hereinafter also referred to as the supply hydraulic pressure) from hydraulic control apparatus 900 to each engagement element is extremely reduced because of failure or the like, each engagement element cannot be maintained in an engaged state. Thus, all the engagement elements may be disengaged. If such a phenomenon occurs, each rotary element constituting transmission 200 may be freed, and may rotate at high speed. This may disadvantageously affect the durability of each component. Accordingly, in the powertrain in the present embodiment, a reduction in the supply hydraulic pressure is sensed at the stage before such phenomenon occurs to provide appropriate control for preventing the high-speed rotation of each rotary element.

Figure 7:
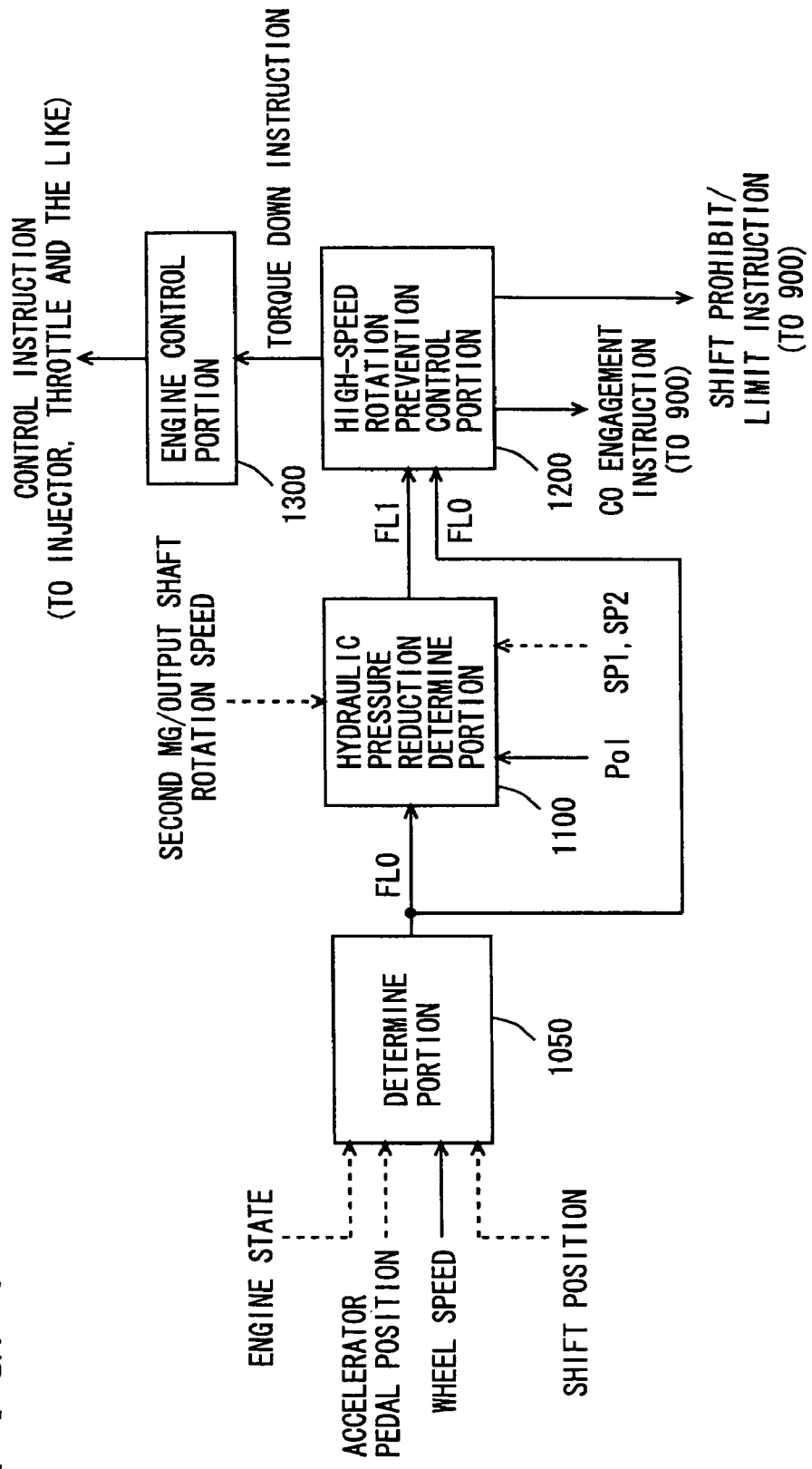
FIG. 7 is a functional block diagram illustrating a control configuration of the powertrain according to the embodiment of the present invention.

FIG. 7 is a functional block diagram illustrating the control configuration of the powertrain according to the embodiment of the present invention. Each block element shown in FIG. 7 is implemented by a hardware or software process by ECU 800.

Referring to FIG. 7, when the supply hydraulic pressure from hydraulic circuit 930 is reduced, a determine portion 1050 determines, based on a state of the vehicle, whether or not it is a vehicular situation where each rotary element constituting first shift portion 300 and second shift portion 400 rotates at an excessively high speed. If it is such a vehicular situation, determine portion 1050 sets a flag FL0 on, and otherwise sets flag FL0 off.

For example, determine portion 1050 sets flag FL0 on when the speed of wheels is equal to or greater than a prescribed value and sets flag FL0 off otherwise, based on an output of a not-shown wheel speed sensor. Alternatively, determine portion 1050 may set flag FL0 on when the accelerator pedal is on and may set flag FL0 off when the accelerator pedal is off or accelerator pedal position is lower than prescribed degree, based on the accelerator pedal position. Further, determine portion 1050 may set flag FL0 on when the engine is in a high-load state, e.g., outputting torque equal to or greater than a prescribed value and set flag FL0 off otherwise, based on a state of the engine. Alternatively, determine portion 1050 may set flag FL0 off when P position (range) or N position (range) is selected and set flag FL0 on when the other positions (ranges) are selected, based on the shift position (range). Further, determine portion 1050 may set on/off of flag FL0 based on the combinations of part of or all of the aforementioned wheel speed, accelerator pedal position, engine state and shift position.

As described above, in a vehicular situation where it is determined that even if the supply hydraulic pressure to each engagement element is reduced, it is less likely that the rotary elements in transmission 200 rotates at an excessively high speed and the control for preventing high-speed rotation, which will be described later, is not necessary, flag FL0 is set off by determine portion 1050. On the other hand, in a vehicular situation where the rotary elements in transmission 200 may possibly rotate at an excessively high speed if the supply hydraulic pressure is reduced, flag FL0 is set on.

A hydraulic pressure reduction determine portion 1100 controls setting on/off of a hydraulic pressure reduction flag FL1, based representatively on detection hydraulic pressure Po1 sensed by hydraulic pressure sensor 940. For example, hydraulic pressure reduction flag FL1 is set on when detection hydraulic pressure Po1 is equal to or smaller than a prescribed determination value, and set off otherwise. It is to be noted that the determination value is set to be an intermediate value between a supply hydraulic pressure level with which the engaged state of each engagement element cannot be maintained and a normal supply hydraulic pressure level.

Alternatively, flag FL1 may be set on when detection hydraulic pressure Po1 is continuously reduced, based on the change rate against time (differential value) of detection hydraulic pressure Po1. Alternatively, hydraulic pressure reduction flag FL1 may be set on as a precaution before the supply hydraulic pressure is actually reduced, in response to failure sense signals SP1, SP2 that are set on in accordance with detection of failure in mechanical oil pump 910 and electric motor driven oil pump 920.

As a still another configuration example, hydraulic pressure reduction determine portion 1100 may control on/off of hydraulic pressure reduction flag FL1 based on a difference between a current gear ratio according to current combination of engagement/disengagement of each engagement element of second shift portion 400 and a rotation speed ratio between input shaft rotation speed NI and output shaft rotation speed NO of second shift portion 400 detected by rotation speed sensors 822 and 824.

A high-speed rotation prevention control portion 1200 generates an engagement command of C0 clutch 314 when hydraulic pressure reduction flag FL1 is set on, and sends the engagement command to hydraulic circuit 930. Thus, when a reduction in the supply hydraulic pressure is detected, the differential operation is brought into a locked state in first shift portion 300, so that sun gear 322, carrier 326, and ring gear 328 rotate integrally. This can increase inertia of carrier 326 rotated by the engine and that of ring gear 328 rotated by second MG 312, thereby preventing transmission element 326 corresponding to the input shaft of second shift portion 400 from rotating at a high speed. As a result, each rotary element constituting second shift portion 400 can be prevented from rotating at an excessively high speed, and therefore deterioration in durability of each configuration component can be prevented.

Furthermore, high-speed rotation prevention control portion 1200 may be configured to generate a torque down command for reducing output torque of engine 100 to engine control portion 1300, when hydraulic pressure reduction flag FL1 is on. Engine control portion 1300 generates a control instruction for limiting output torque of engine 100 such as stopping injection of fuel (fuel cut), retarding angle of ignition timing, stopping combustion in a part of cylinders, or limiting throttle opening degree, in response to the torque down command from high-speed rotation prevention control portion 1200.

Figure 8:
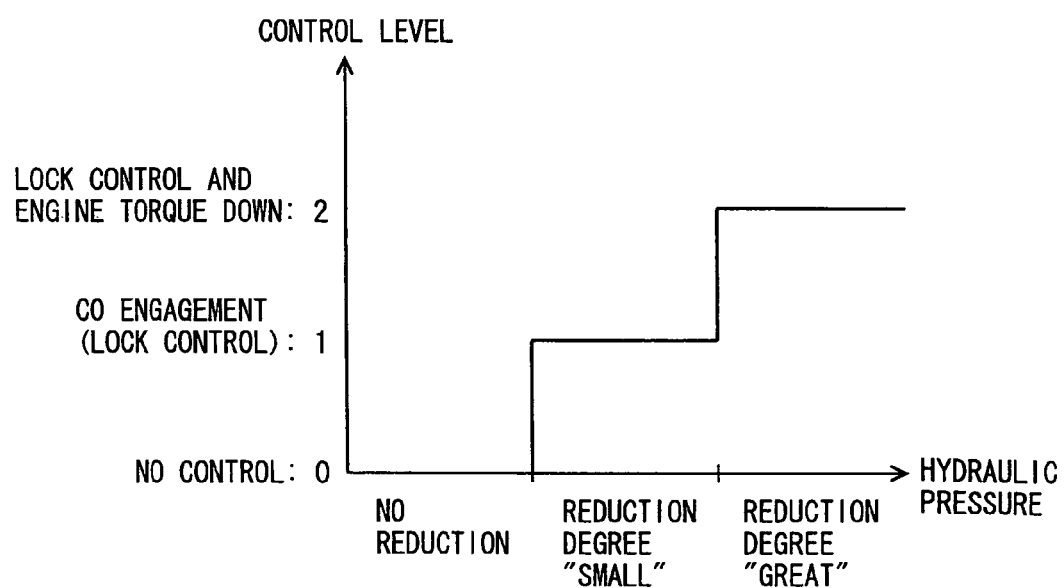
FIG. 8 is a conceptual diagram illustrating high-speed rotation prevention control in accordance with the degree of reduction in the supply hydraulic pressure.

As shown in FIG. 8, detail of high-speed rotation prevention control of high-speed rotation prevention control portion 1200 may be selectively used in accordance with the degree of reduction in the supply hydraulic pressure. For example, hydraulic pressure reduction determine portion 1100 determines whether the degree of reduction in the hydraulic pressure is "great" or "small" based on detection hydraulic pressure Po1 or the like, when hydraulic pressure reduction flag FL1 is on. Then, when the degree of reduction in the hydraulic pressure is "great", high-speed rotation prevention control portion 1200 executes both the differential lock control and engine torque down control by generating an engagement command of C0 clutch 314 (control level 2). On the other hand, when the hydraulic reduction degree is "small", high-speed rotation prevention control portion 1200 instructs only the differential lock control, without executing the engine torque down control (control level 1). When there is no reduction in the hydraulic pressure, that is, when hydraulic pressure reduction flag FL1 is off, none of the differential lock control and engine torque down control are executed (control level 0).

With such a control configuration, when the degree of reduction in the supply hydraulic pressure is great, the electrical differential portion (power split device 310) is locked and the engine output torque is reduced, thereby preventing on a priority basis occurrence of an excessively high-speed rotation of the rotary elements in first shift portion 300 and second shift portion 400. On the other hand, when the degree of reduction in the supply hydraulic pressure is small, the output torque of engine 100 is not limited so that pull-over driving at a very low speed using an engine output can be performed.

Referring to FIG. 7 again, when hydraulic pressure reduction flag FL1 is set on, high-speed rotation prevention control portion 1200 may be configured to further generate a control command for prohibiting or limiting shifting by second shift portion 400 when executing the high-speed rotation prevention control. Thus, the disengagement/engagement state of each engagement element in second shift portion 400 is not largely changed in a state where supply hydraulic pressure is reduced, and therefore additional unintended fluctuation in the rotation speed can be prevented.

A preferable control configuration is that, when determine portion 1050 sets flag FL0 off, hydraulic pressure reduction flag FL1 is fixed to off, or, high-speed rotation prevention control by high-speed rotation prevention control portion 1200 is not executed even if FL1 is set on. Thus, in a vehicular situation where each rotary element in transmission 200 will not rotate at a high speed even if the supply hydraulic pressure is reduced, unnecessary execution of the high-speed rotation prevention control can be avoided.

Figure 9:
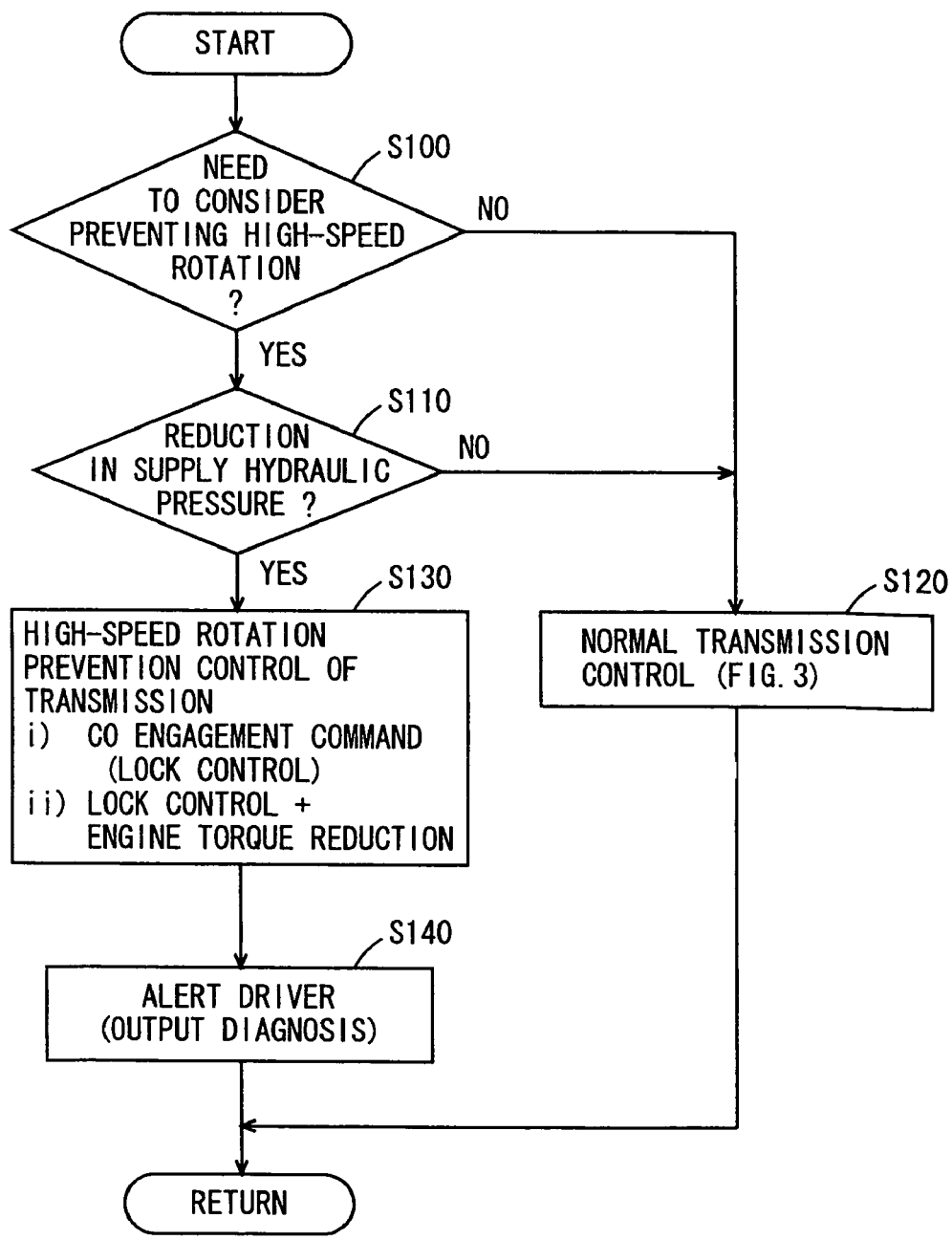
FIG. 9 is a flowchart showing a first example of a control structure of a program executed by an ECU.
Figure 10:
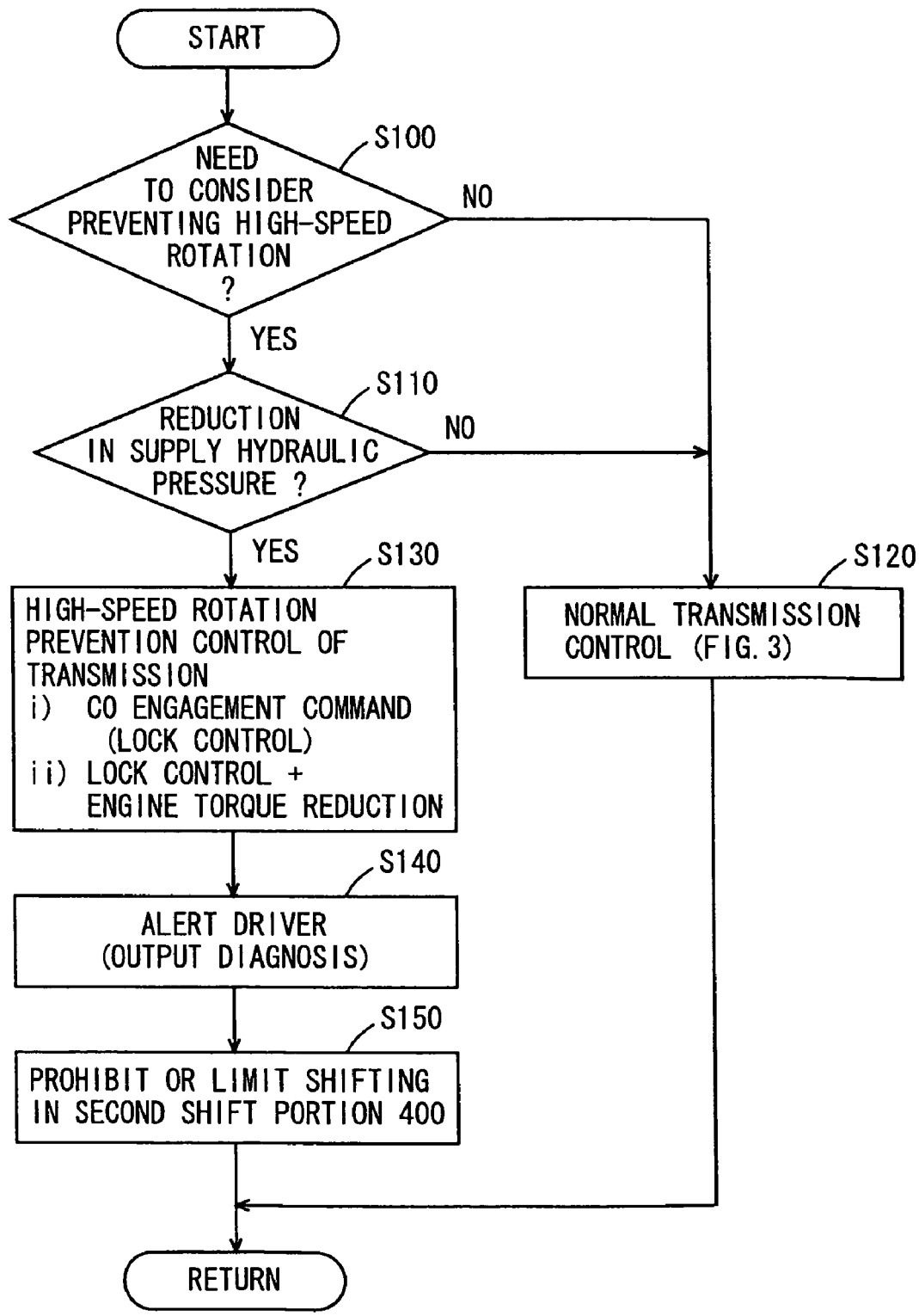
FIG. 10 is a flowchart showing a second example of the control structure of the program executed by the ECU.

FIG. 9 is a flowchart illustrating the control structure when the hydraulic pressure in reduced in the powertrain according to the present invention. The control procedure based on the flowcharts of FIGS. 9 and 10 is realized by execution of a program stored in advance in ECU 800, at a prescribed cycle.

Referring to FIG. 9, ECU 800 determines in step S100, whether or not it is a vehicular situation where prevention of high-speed rotation of constituent components (rotary elements) in transmission 200 must be considered, when there is a reduction in the supply hydraulic pressure. That is, the process in step S100 corresponds to the function of determine portion 1050 in FIG. 7.

When YES in step S100, that is, when flag FL0 is on, ECU 800 determines in step S110, whether or not there is a reduction in the supply hydraulic pressure from hydraulic pressure control apparatus 900 to each engagement element. As described above, the process in step S110 corresponds to the function of hydraulic pressure reduction determine portion 1100 in FIG. 7. Based on detection hydraulic pressure Po1 by hydraulic pressure sensor 940 or its differential value for time, failure sense signals SP1, SP2, of oil pumps 910, 920, or a rotation speed ratio between input shaft rotation speed NI and output shaft rotation speed NO, whether or not there is a reduction in the supply oil pressure is determined.

When there is a reduction in the supply hydraulic pressure where hydraulic pressure reduction flag FL1 is set on, that is, when YES in step S110, ECU 800 executes, in step S130, high-speed rotation prevention control of transmission 200. As described above, as the high-speed rotation prevention control, the lock control of the electrical differential portion by generation of the engagement command of C0 clutch 314 is executed, or, in addition thereto, the engine torque reduction control is executed.

Further, in step S140, ECU 800 puts out an alert to the driver that there is a reduction in the supply hydraulic pressure in transmission 200, and additionally, ECU 800 stores a diagnosis code. Output of the diagnosis code will allow the failure detail and the location of the failure to be easily specified on the occasion of repair.

On the other hand, when it is a vehicular situation where it is not necessary to consider preventing the high-speed rotation of the constituent components (rotary elements) in transmission 200 (NO in step S100), or when there is no reduction in the supply hydraulic pressure (NO in step S110), ECU 800 executes normal shift control in step S120. Here, an appropriate gear ratio (gear) of transmission 200 is set by the selection of a shift position by the driver or in accordance with the shift map shown in FIG. 4. Disengagement/engagement of each engagement element is controlled in accordance with FIG. 3, so that the selected gear is implemented.

Alternatively, as shown in FIG. 10, when there is a reduction in the supply hydraulic pressure, ECU 800 may control, in step S150 subsequently to steps S130 and S140, so that shifting in second shift portion 400 is prohibited or limited. It is to be noted that the processes in steps S130-150 correspond to the functions of high-speed rotation prevention control portion 1200 in FIG. 7.

As described above, according to the powertrain and the method of controlling the same of the present invention, when there is a reduction in a supply hydraulic pressure to second shift portion 400 constituting transmission 200, by bringing the electrical differential portion into a locked state in first shift portion 300, or, in addition thereto, by reducing output torque of engine 100, high-speed rotation of transmission member 206 corresponding to the input shaft of second shift portion 400 can be prevented. As a result, even when the supply hydraulic pressure is extremely reduced and each rotary element constituting transmission 200 (in particular, second shift portion 400) is freed, excessive high-speed rotation of such a rotary element can be prevented. Thus, even when there is a reduction in the supply hydraulic pressure due to a failure in the hydraulic pressure supply apparatus, deterioration in durability of each constituent components in transmission 200 can be prevented.

It is to be noted that, in order to further surely bring C0 clutch 314 into an engagement state and the electrical differential portion into a locked state when there is a reduction in the supply hydraulic pressure, a configuration may be employed in which an accumulator 945 for preventing a reduction in the hydraulic pressure is arranged in the hydraulic pressure path to C0 clutch 314 in hydraulic circuit 930 (FIG. 6).

Figure 11:
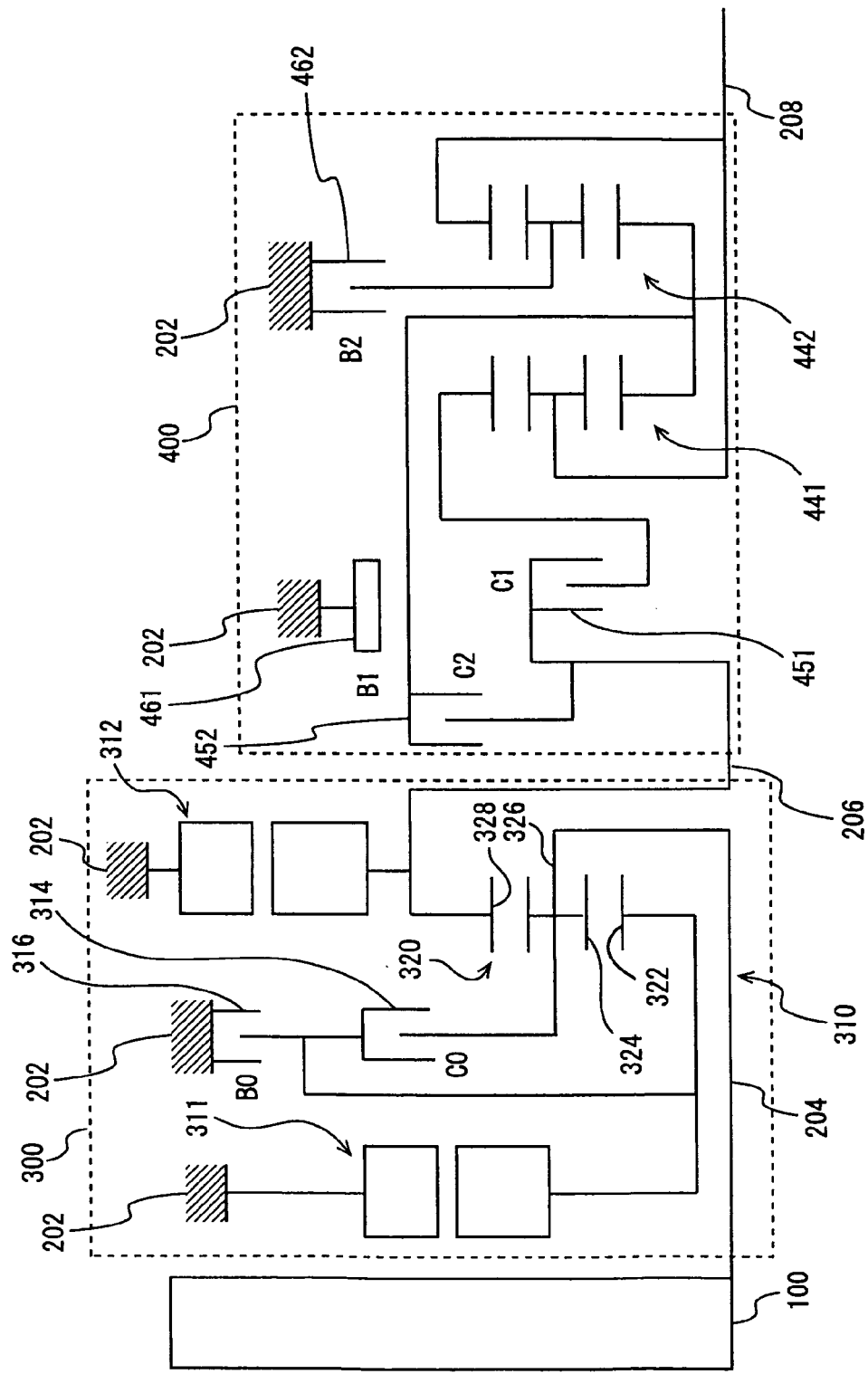
FIG. 11 is a skeleton diagram showing another exemplary configuration of the transmission shown in FIG. 1.

Instead of allowing five forward gears to be implemented in transmission 200, four forward gears of first to fourth gears may be allowed to be implemented in transmission 200. When transmission 200 is configured to be capable of implementing four forward gears, as shown in FIG. 11, second shift portion 400 includes two single pinion type planetary gears 441 and 442 and four engagement elements of a C1 clutch 451, a C2 clutch 452, a B1 brake 461, and a B2 brake 462. By the engagement of the engagement elements in FIG. 11 in the combinations shown in the operation table of FIG. 12, four forward gears of first to fourth gears can be implemented.

Figures 12, 13:
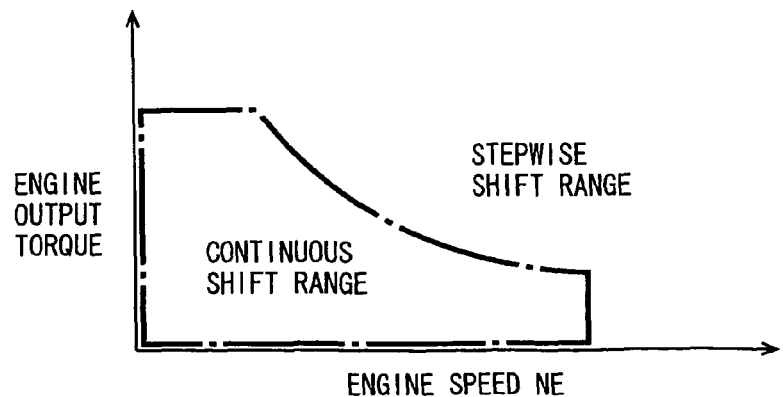
FIG. 12 is an operation table of the transmission shown in FIG. 11.
FIG. 13 is a conceptual diagram illustrating another example of switching control between a continuous shift state and a stepwise shift state.

Instead of switching between the continuous shift state and the stepwise shift state based on a switching line defined in the shift map, it is also possible to switch between the continuous shift state and the stepwise shift state based on the map having output torque of engine 100 and engine speed NE as parameters, as shown in FIG. 13.

While second shift portion 400 has been exemplary described to be a stepwise shift portion in the present embodiment, the present invention can similarly address the problem of high-speed rotation of the rotary elements associated with a reduction in the supply hydraulic pressure, even when second shift portion 400 is formed with a CVT (continuously variable transmission). That is, not being particularly limited, second shift portion 400 can be of any configuration so long as it is a mechanism where rotation elements rotate at a high speed in accordance with a reduction in the supply hydraulic pressure.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a powertrain, said powertrain comprising:
    an electrical differential portion being configured such that a differential operation of an input rotation speed of an input shaft and an output rotation speed of an output shaft is controlled by an electric motor having its operation state controlled, said electric motor being coupled to a first rotary element of said electrical differential portion so as to be capable of transmitting motive power;
    a shift portion including an engagement element allowing the motive power to be transmitted from said electrical differential portion to a driving wheel by receiving an available supply hydraulic pressure, the available supply hydraulic pressure being an available hydraulic pressure from a hydraulic control apparatus; and a differential state switching mechanism configured to switch said electrical differential portion between a differential state where differential is performed and a locked state where the differential is not performed, wherein said electrical differential portion is brought into said locked state by said differential state switching mechanism, when a reduction in the available supply hydraulic pressure to said engagement element is sensed to be below a prescribed determination value, but before the available supply hydraulic pressure becomes insufficient to maintain the engagement element in an engaged state, said electrical differential portion includes said first rotary element, a second rotary element coupled to the input shaft, and a third rotary element coupled to the output shaft, and said electrical differential portion is configured such that said first to third rotary elements are rotatable relative to one another in said differential state, and said first to third rotary elements rotate integrally in said locked state.

2. The control apparatus for the powertrain according to claim 1, wherein said electrical differential portion operates as a continuous shift mechanism by said electric motor having its operation state controlled.

3. The control apparatus for the powertrain according to claim 1, wherein said shift portion functions as a stepwise automatic shift portion by combinations of engagement and disengagement of a plurality of said engagement elements.

4. The control apparatus for the powertrain according to claim 1, wherein the available supply hydraulic pressure is an available hydraulic pressure for said engagement element and all other engagement elements in the powertrain.

5. The control apparatus for the powertrain according to claim 1, wherein said electrical differential portion is brought into said locked state by said differential state switching mechanism prior to failure.

6. The control apparatus for the powertrain according to claim 1, wherein at least a portion of the available supply hydraulic pressure becomes an applied hydraulic pressure to engage said engagement element.

7. A method of controlling a powertrain, said powertrain comprising:

an electrical differential portion being configured such that a differential operation of an input rotation speed and an output rotation speed is controlled by an electric motor having its operation state controlled, said electric motor being coupled to a first rotary element of said electrical differential portion so as to be capable of transmitting motive power;

a shift portion including an engagement element allowing the motive power to be transmitted from said electrical differential portion to a driving wheel by receiving an available supply hydraulic pressure, the available supply hydraulic pressure being an available hydraulic pressure from a hydraulic control apparatus; and a differential state switching mechanism that switches said electrical differential portion between a differential state where differential is performed and a locked state where the differential is not performed, wherein said electrical differential portion includes said first rotary element, a second rotary element coupled to an input shaft, and a third rotary element coupled to an output shaft, and said electrical differential portion is configured such that said first to third rotary elements are rotatable relative to one another in said differential state, and said first to third rotary elements rotate integrally in said locked state, said method comprising:

a first step of sensing a reduction in the available supply hydraulic pressure to said engagement element; and a second step of bringing said electrical differential portion into said locked state by said differential state switching mechanism, when the reduction in said available supply hydraulic pressure is sensed to be below a prescribed determination value, but before the available supply hydraulic pressure becomes insufficient to maintain the engagement element in an engaged state.

8. The method of controlling a powertrain according to claim 7, the available supply hydraulic pressure is an available hydraulic pressure for said engagement element and all other engagement elements in the powertrain.

9. The method of controlling a powertrain according to claim 7, wherein the second step of bringing said electrical differential portion into said locked state by said differential state switching mechanism is performed prior to failure.

10. The method of controlling a powertrain according to claim 7, at least a portion of the available supply hydraulic pressure becomes an applied hydraulic pressure to engage said engagement element.

* * * * *